United States Patent
Yang et al.

(10) Patent No.: US 11,121,845 B2
(45) Date of Patent: Sep. 14, 2021

(54) CYCLIC SHIFT CONFIGURATION FOR PUCCH WITH PI/2 BPSK MODULATION

(71) Applicant: QUALCOMM Incorporated, San Diego, CA (US)

(72) Inventors: Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/862,077

(22) Filed: Apr. 29, 2020

(65) Prior Publication Data

US 2020/0351061 A1    Nov. 5, 2020

Related U.S. Application Data

(60) Provisional application No. 62/843,151, filed on May 3, 2019.

(51) Int. Cl.
  *H04L 27/20*    (2006.01)
  *H04L 5/00*     (2006.01)

(52) U.S. Cl.
  CPC ........ *H04L 5/0057* (2013.01); *H04L 27/2035* (2013.01)

(58) Field of Classification Search
  CPC ... H04L 5/0055; H04L 5/0051; H04L 5/0057; H04L 27/2035
  USPC ........................................ 375/219, 267, 308
  See application file for complete search history.

(56) References Cited

U.S. PATENT DOCUMENTS

| 2009/0238121 A1* | 9/2009 | Kotecha | H04L 1/0031 370/329 |
| 2009/0268685 A1* | 10/2009 | Chen | H04L 5/0053 370/329 |
| 2011/0085495 A1* | 4/2011 | Ko | H04J 11/003 370/328 |
| 2011/0205994 A1* | 8/2011 | Han | H04L 1/0668 370/329 |

(Continued)

OTHER PUBLICATIONS

IITH., et al., "Low PAPR Reference Signals," 3GPP Draft, 3GPP TSG RAN WG1 Meeting #95, R1-1813086, 3rd Generation Partnership Project (3GPP), Mobile Competence Centre, 650, Route Des Lucioles, F-06921, Sophia-Antipolis Cedex, France, vol. Ran WG1. No. Spokane. USA; Nov. 12, 2018-Nov. 16, 2018, Nov. 11, 2018 (Nov. 11, 2018), XP051555067 20 pages, Retrieved from the Internet: URL: http://www.3gpp.org/ftp/Meetings%5F3GPP%5FSYNC/RAN1/Docs/R1%2D1813086%2Ezip [retrieved on Nov. 11, 2018], paragraph [0002] - paragraph [0003].

(Continued)

*Primary Examiner* — Emmanuel Bayard
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may cyclically shift, based at least in part on a cyclic shift index selected from a group of cyclic shift indexes, a demodulation reference signal (DMRS) sequence. The UE may transmit, on a physical uplink control channel (PUCCH), a DMRS corresponding to the shifted DMRS sequence with pi/2 binary phase shift key (BPSK) modulation. Numerous other aspects are provided.

52 Claims, 10 Drawing Sheets

(56) References Cited

U.S. PATENT DOCUMENTS

| | | | | |
|---|---|---|---|---|
| 2013/0157667 | A1* | 6/2013 | Nakamura | H04B 7/0848 |
| | | | | 455/440 |
| 2015/0045016 | A1* | 2/2015 | Xiong | H04W 4/80 |
| | | | | 455/426.1 |
| 2018/0316464 | A1* | 11/2018 | Stern-Berkowitz | |
| | | | | H04L 1/1657 |
| 2019/0037601 | A1* | 1/2019 | Noh | H04L 27/0006 |
| 2019/0081660 | A1* | 3/2019 | Han | H04L 27/2613 |
| 2019/0103945 | A1* | 4/2019 | Medles | H04L 27/261 |
| 2019/0245640 | A1* | 8/2019 | Yoshimoto | H04L 5/0053 |
| 2020/0266946 | A1* | 8/2020 | Kim | H04B 1/713 |
| 2021/0014003 | A1* | 1/2021 | Sundberg | H04L 5/0048 |

OTHER PUBLICATIONS

International Search Report and Written Opinion—PCT/US2020/030729—ISA/EPO—dated Jul. 8, 2020.
Qualcomm Incorporated: "Lower PAPR Reference Signals", 3GPP TSG RAN WG1 Meeting #95, 3GPP Draft; R1-1813445 Lower PAPR Reference Signals, 3rd Generation Partnership Project (3GPP), Mobile Competence Centre; 650, Route Des Lucioles; F-06921 Sophia-Antipolis Cedex; France, vol. Ran WG1, No. Spokane, WA, USA; Nov. 12, 2018-Nov. 16, 2018, Nov. 3, 2018 (Nov. 3, 2018), pp. 1-24, XP051479767, Retrieved from the Internet: URL: http://www.3gpp.org/ftp/tsg%5Fran/WG1%5FRL1/TSGR1%5F95/Docs/R1%2D1813445%2Ezip [retrieved on Nov. 3, 2018] Section 4.

* cited by examiner

500 →

| DMRS Sequence Index \ Cyclic Shift Index | 0 | 1 | 2 | 3 | 4 | 5 | 6 | 7 | 8 | 9 | 10 | 11 |
|---|---|---|---|---|---|---|---|---|---|---|---|---|
| 0 | 1.000 | 0.000 | 0.000 | 0.000 | 0.000 | 0.000 | 0.333 | 0.000 | 0.000 | 0.000 | 0.000 | 0.000 |
| 1 | 1.000 | 0.000 | 0.000 | 0.000 | 0.000 | 0.333 | 0.333 | 0.333 | 0.000 | 0.000 | 0.000 | 0.000 |
| 2 | 1.000 | 0.000 | 0.000 | 0.000 | 0.000 | 0.000 | 0.333 | 0.000 | 0.000 | 0.000 | 0.000 | 0.000 |
| 3 | 1.000 | 0.000 | 0.000 | 0.333 | 0.000 | 0.333 | 0.333 | 0.333 | 0.000 | 0.333 | 0.000 | 0.000 |
| 4 | 1.000 | 0.000 | 0.000 | 0.000 | 0.000 | 0.000 | 0.333 | 0.000 | 0.000 | 0.000 | 0.000 | 0.000 |
| 5 | 1.000 | 0.333 | 0.000 | 0.333 | 0.333 | 0.000 | 0.000 | 0.000 | 0.333 | 0.333 | 0.000 | 0.333 |
| 6 | 1.000 | 0.000 | 0.000 | 0.333 | 0.333 | 0.333 | 0.000 | 0.333 | 0.333 | 0.333 | 0.000 | 0.000 |
| 7 | 1.000 | 0.000 | 0.000 | 0.333 | 0.333 | 0.333 | 0.000 | 0.333 | 0.333 | 0.333 | 0.000 | 0.000 |
| 8 | 1.000 | 0.000 | 0.000 | 0.333 | 0.333 | 0.333 | 0.000 | 0.333 | 0.333 | 0.333 | 0.000 | 0.000 |
| 9 | 1.000 | 0.000 | 0.000 | 0.000 | 0.333 | 0.000 | 0.000 | 0.000 | 0.333 | 0.000 | 0.000 | 0.000 |
| 10 | 1.000 | 0.000 | 0.000 | 0.333 | 0.333 | 0.000 | 0.333 | 0.000 | 0.333 | 0.333 | 0.000 | 0.000 |
| 11 | 1.000 | 0.000 | 0.333 | 0.000 | 0.000 | 0.000 | 0.000 | 0.000 | 0.000 | 0.000 | 0.333 | 0.000 |
| 12 | 1.000 | 0.000 | 0.000 | 0.333 | 0.333 | 0.000 | 0.333 | 0.000 | 0.333 | 0.333 | 0.000 | 0.000 |
| 13 | 1.000 | 0.000 | 0.000 | 0.333 | 0.333 | 0.000 | 0.333 | 0.000 | 0.333 | 0.333 | 0.000 | 0.000 |
| 14 | 1.000 | 0.000 | 0.333 | 0.000 | 0.000 | 0.000 | 0.333 | 0.000 | 0.000 | 0.000 | 0.333 | 0.000 |
| 15 | 1.000 | 0.000 | 0.000 | 0.000 | 0.000 | 0.000 | 0.667 | 0.000 | 0.000 | 0.000 | 0.000 | 0.000 |
| 16 | 1.000 | 0.000 | 0.000 | 0.000 | 0.000 | 0.000 | 0.667 | 0.000 | 0.000 | 0.000 | 0.000 | 0.000 |
| 17 | 1.000 | 0.333 | 0.000 | 0.000 | 0.000 | 0.333 | 0.667 | 0.333 | 0.000 | 0.000 | 0.000 | 0.333 |
| 18 | 1.000 | 0.000 | 0.000 | 0.000 | 0.000 | 0.000 | 0.333 | 0.000 | 0.000 | 0.000 | 0.000 | 0.000 |
| 19 | 1.000 | 0.000 | 0.000 | 0.000 | 0.000 | 0.333 | 0.333 | 0.333 | 0.000 | 0.000 | 0.000 | 0.000 |
| 20 | 1.000 | 0.000 | 0.333 | 0.000 | 0.000 | 0.000 | 0.000 | 0.000 | 0.000 | 0.000 | 0.333 | 0.000 |
| 21 | 1.000 | 0.333 | 0.000 | 0.000 | 0.000 | 0.333 | 0.667 | 0.333 | 0.000 | 0.000 | 0.000 | 0.333 |
| 22 | 1.000 | 0.000 | 0.000 | 0.333 | 0.333 | 0.000 | 0.333 | 0.000 | 0.333 | 0.333 | 0.000 | 0.000 |
| 23 | 1.000 | 0.000 | 0.000 | 0.000 | 0.000 | 0.333 | 0.333 | 0.333 | 0.000 | 0.000 | 0.000 | 0.000 |
| 24 | 1.000 | 0.333 | 0.333 | 0.333 | 0.333 | 0.000 | 0.333 | 0.000 | 0.333 | 0.333 | 0.333 | 0.333 |
| 25 | 1.000 | 0.333 | 0.333 | 0.000 | 0.000 | 0.333 | 0.333 | 0.333 | 0.000 | 0.000 | 0.333 | 0.333 |
| 26 | 1.000 | 0.000 | 0.000 | 0.000 | 1.000 | 0.000 | 0.000 | 0.000 | 1.000 | 0.000 | 0.000 | 0.000 |
| 27 | 1.000 | 0.000 | 0.000 | 0.333 | 0.000 | 0.333 | 0.333 | 0.333 | 0.000 | 0.333 | 0.000 | 0.000 |
| 28 | 1.000 | 0.000 | 0.000 | 0.333 | 0.333 | 0.000 | 0.333 | 0.000 | 0.333 | 0.333 | 0.000 | 0.000 |
| 29 | 1.000 | 0.000 | 0.000 | 0.333 | 0.333 | 0.333 | 0.000 | 0.333 | 0.333 | 0.333 | 0.000 | 0.000 |
| Average Auto-Correlation | 1.000 | 0.056 | 0.056 | 0.144 | 0.167 | 0.133 | 0.278 | 0.133 | 0.167 | 0.144 | 0.056 | 0.056 |

FIG. 5

CYCLIC SHIFT CONFIGURATION FOR PUCCH WITH PI/2 BPSK MODULATION

CROSS-REFERENCE TO RELATED APPLICATION

This application claims priority to U.S. Provisional Patent Application No. 62/843,151, filed on May 3, 2019, entitled "CYCLIC SHIFT CONFIGURATION FOR PUCCH WITH PI/2 BPSK MODULATION," which is hereby expressly incorporated by reference as if fully set forth below in its entirety and for all applicable purposes.

FIELD OF THE DISCLOSURE

Aspects of the present disclosure generally relate to wireless communication and to techniques and apparatuses for cyclic shift configuration for physical uplink control channel (PUCCH) with pi/2 binary phase shift key (BPSK) modulation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a user equipment (UE), may include cyclically shifting, based at least in part on a cyclic shift index selected from a group of cyclic shift indexes, a demodulation reference signal (DMRS) sequence, wherein a cyclic gap between cyclic shift indexes included in the group of cyclic shift indexes is at least 2 and is not 6; and transmitting, on a physical uplink control channel (PUCCH), a DMRS corresponding to the shifted DMRS sequence with pi/2 binary phase shift key (BPSK) modulation.

In some aspects, a UE for wireless communication may include memory and one or more processors operatively coupled to the memory. The memory and the one or more processors may be configured to cyclically shift, based at least in part on a cyclic shift index selected from a group of cyclic shift indexes, a DMRS sequence, wherein a cyclic gap between cyclic shift indexes included in the group of cyclic shift indexes is at least 2 and is not 6; and transmit, on a PUCCH, a DMRS corresponding to the shifted DMRS sequence with pi/2 BPSK modulation.

In some aspects, a non-transitory computer-readable medium may store one or more instructions for wireless communication. The one or more instructions, when executed by one or more processors of a UE, may cause the one or more processors to cyclically shift, based at least in part on a cyclic shift index selected from a group of cyclic shift indexes, a DMRS sequence, wherein a cyclic gap between cyclic shift indexes included in the group of cyclic shift indexes is at least 2 and is not 6; and transmit, on a PUCCH, a DMRS corresponding to the shifted DMRS sequence with pi/2 BPSK modulation.

In some aspects, an apparatus for wireless communication may include means for cyclically shifting, based at least in part on a cyclic shift index selected from a group of cyclic shift indexes, a DMRS sequence, wherein a cyclic gap between cyclic shift indexes included in the group of cyclic shift indexes is at least 2 and is not 6; and means for transmitting, on a PUCCH, a DMRS corresponding to the shifted DMRS sequence with pi/2 BPSK modulation.

In some aspects, a method of wireless communication, performed by a UE, may include receiving an indication of a plurality of groups of cyclic shift indexes, wherein each group of cyclic shift indexes, of the plurality of groups of cyclic shift indexes, is associated with one or more DMRS sequences; cyclically shifting a DMRS sequence of the one or more DMRS sequences based at least in part on a cyclic shift index that is included in a group of cyclic shift indexes associated with the DMRS sequence; and transmitting, on a PUCCH, a DMRS corresponding to the shifted DMRS sequence with pi/2 BPSK modulation.

In some aspects, a UE for wireless communication may include memory and one or more processors operatively coupled to the memory. The memory and the one or more processors may be configured to receive an indication of a plurality of groups of cyclic shift indexes, wherein each group of cyclic shift indexes, of the plurality of groups of cyclic shift indexes, is associated with one or more DMRS sequences; cyclically shift a DMRS sequence of the one or more DMRS sequences based at least in part on a cyclic shift index that is included in a group of cyclic shift indexes associated with the DMRS sequence; and transmit, on a PUCCH, a DMRS corresponding to the shifted DMRS sequence with pi/2 BPSK modulation.

In some aspects, a non-transitory computer-readable medium may store one or more instructions for wireless communication. The one or more instructions, when executed by one or more processors of a UE, may cause the one or more processors to receive an indication of a plurality of groups of cyclic shift indexes, wherein each group of cyclic shift indexes, of the plurality of groups of cyclic shift indexes, is associated with one or more DMRS sequences; cyclically shift a DMRS sequence of the one or more DMRS sequences based at least in part on a cyclic shift index that is included in a group of cyclic shift indexes associated with the DMRS sequence; and transmit, on a PUCCH, a DMRS corresponding to the shifted DMRS sequence with pi/2 BPSK modulation.

In some aspects, an apparatus for wireless communication may include means for receiving an indication of a plurality of groups of cyclic shift indexes, wherein each group of cyclic shift indexes, of the plurality of groups of cyclic shift indexes, is associated with one or more DMRS sequences; means for cyclically shifting a DMRS sequence of the one or more DMRS sequences based at least in part on a cyclic shift index that is included in a group of cyclic shift indexes associated with the DMRS sequence; and means for transmitting, on a PUCCH, a DMRS corresponding to the shifted DMRS sequence with pi/2 BPSK modulation.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 illustrates a table of auto-correlation results for example simulations of demodulation reference signal (DMRS) sequences.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
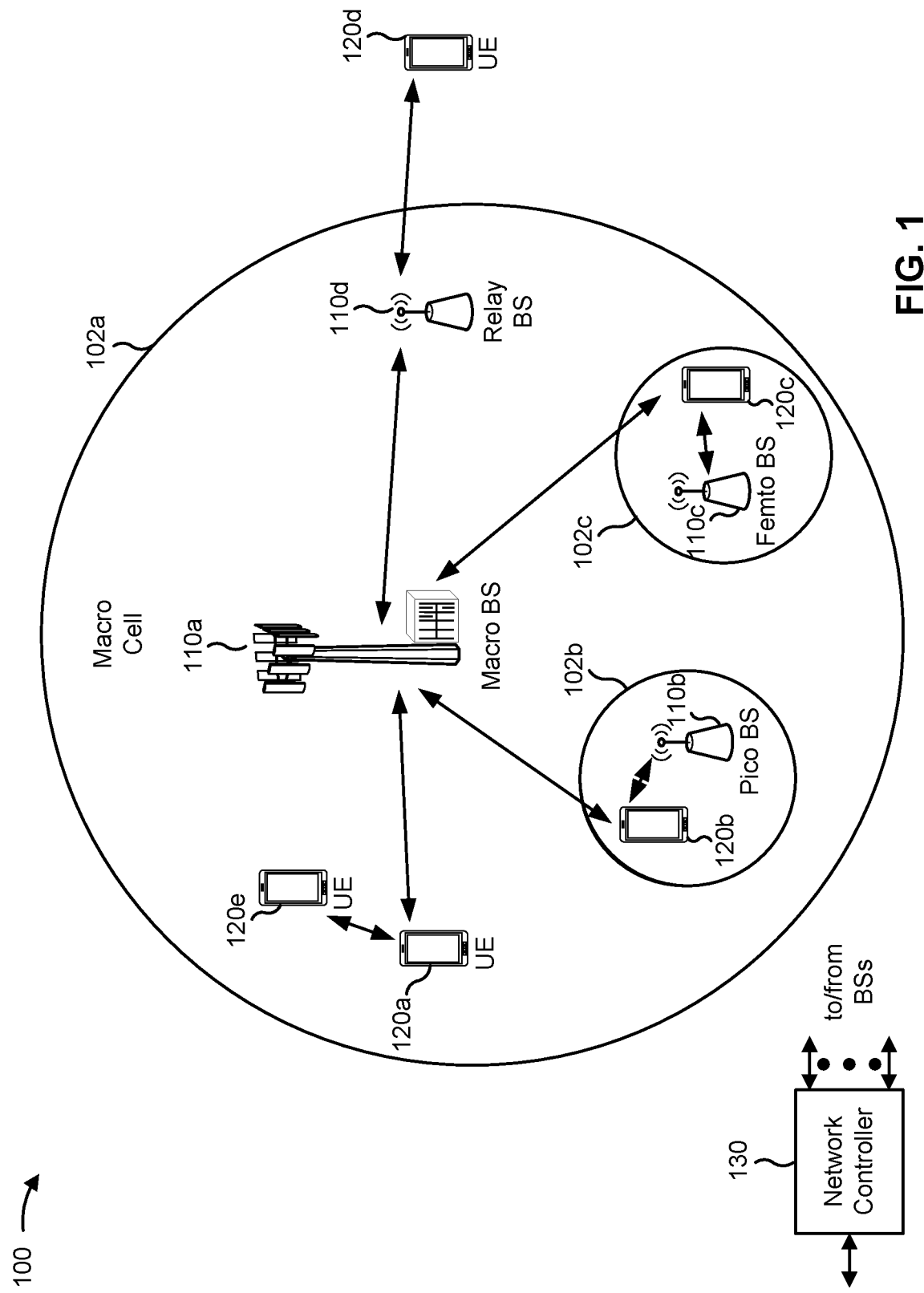
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like. Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
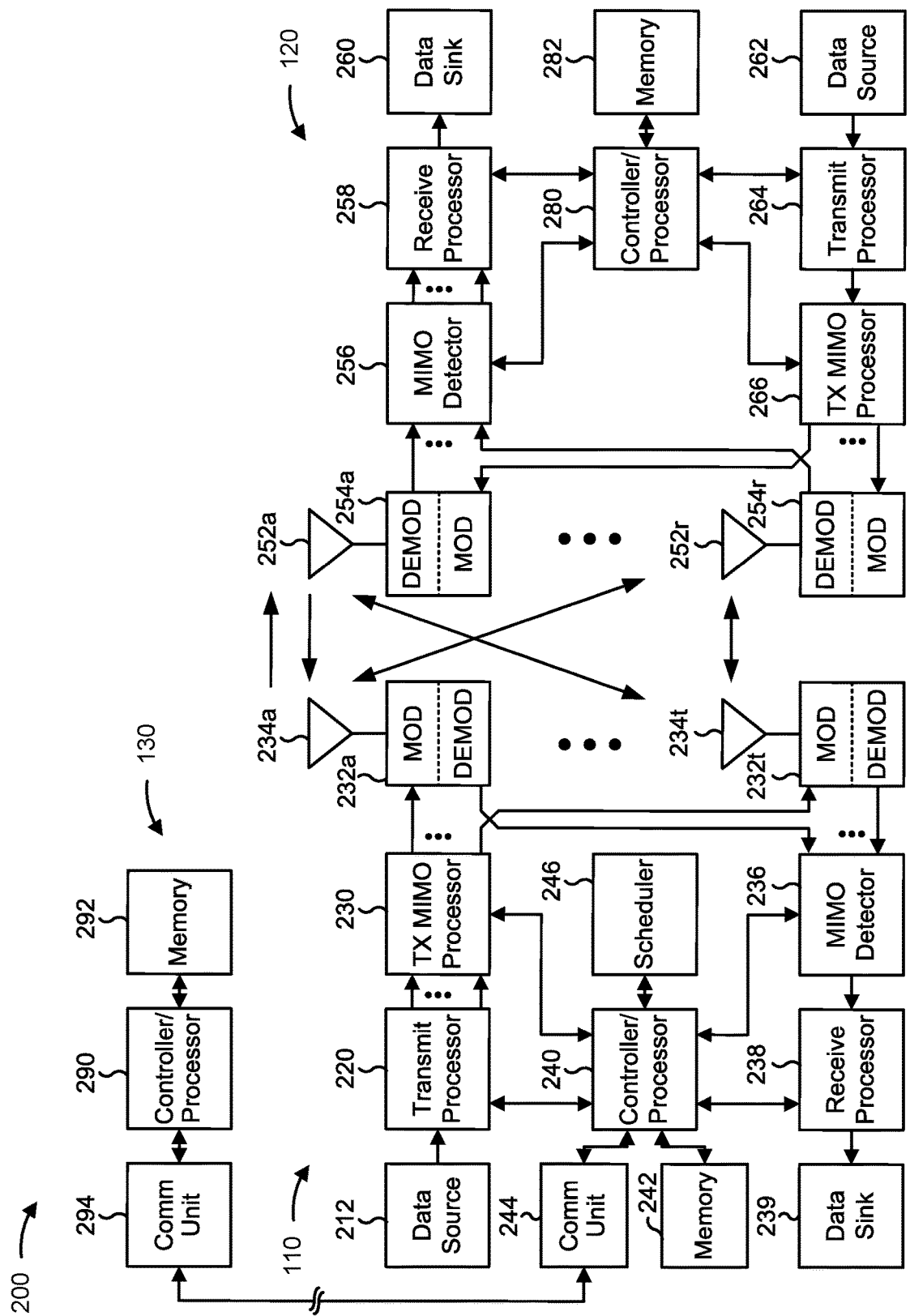
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Although, in many implementations, aspects of performing or directing operations of one or more techniques associated with cyclically shifting DMRS for physical uplink control channel (PUCCH) with pi/2 binary phase shift key (BPSK) modulation, as described in more detail elsewhere herein, typically involve modulator 254 of UE 120 (or modulator 232 of base station 110), TX MIMO processor 266 of UE 120 (or TX MIMO processor 230 of base station 110), transmit processor 164 of UE 120 (or transmit processor 220 of base station 110), or any combination thereof, controller/processor 240 of base station 110, controller/processor 280 of UE 120, and/or any other component(s) of FIG. 2 may also perform, or be involved in performing, one or more techniques associated with cyclic shift configuration for physical uplink control channel (PUCCH) with pi/2 binary phase shift key (BPSK) modulation, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. As such, memory 282 of the UE 120 can comprise a non-transitory computer-readable medium storing one or more instructions for wireless communication, where the one or more instructions comprise one or more instructions that, when executed by one or more processors (e.g., receive processor 258, transmit processor 264, and/or controller/processor 280) of the UE 120, cause the one or more processors to perform the method(s) described in greater detail with reference to FIGS. 6A, 6B, 7, and/or 8. A scheduler 246 may schedule UEs for data transmission on the downlink and/or uplink.

In some aspects, UE 120 may include means for cyclically shifting, based at least in part on a cyclic shift index selected from a group of cyclic shift indexes, a demodulation reference signal (DMRS) sequence, wherein a cyclic gap between cyclic shift indexes included in the group of cyclic shift indexes is at least 2 and is not 6 (e.g., using controller/processor 280, memory 282, and/or the like), means for transmitting, on a PUCCH, a DMRS corresponding to the shifted DMRS sequence with pi/2 BPSK modulation (e.g., using controller/processor 280, transmit processor 264, TX MIMO processor 266, MOD 254, antenna 252, memory 282, and/or the like), and/or the like. In some aspects, such means may include one or more components of UE 120 described in connection with FIG. 2, for example, modulator 254, TX MIMO processor 166, transmit processor 164, controller/processor 280, and/or the like, or any combination thereof. In some aspects, UE 120 may include means for receiving an indication of the plurality of groups of cyclic shift indexes, wherein each group of cyclic shift indexes, of the plurality of groups of cyclic shift indexes, is associated with one or more DMRS sequences (e.g., using antenna 252, DEMOD 254, MIMO detector 256, receive processor 258, controller/processor 280, memory 282, and/or the like), means for cyclically shifting a DMRS sequence of the one or more DMRS sequences based at least in part on a cyclic shift index that is included in a group of cyclic shift indexes associated with the DMRS sequence (e.g., using controller/processor 280, memory 282, and/or the like), means for transmitting, on a PUCCH, a DMRS corresponding to the shifted DMRS sequence with pi/2 BPSK modulation (e.g., using controller/processor 280, transmit processor 264, TX MIMO processor 266, MOD 254, antenna 252, memory 282, and/or the like), and/or the like. In some aspects, such means may include one or more components of UE 120 described in connection with FIG. 2, for example, demodulator 254, MIMO detector 256, receiver processor 258, modulator 254, TX MIMO processor 266, transmit processor 264, controller/processor 280, and/or the like, or any combination thereof.

As indicated above, FIG. 2 is provided as an example. Other examples may differ from what is described with regard to FIG. 2.

Figure 3A:
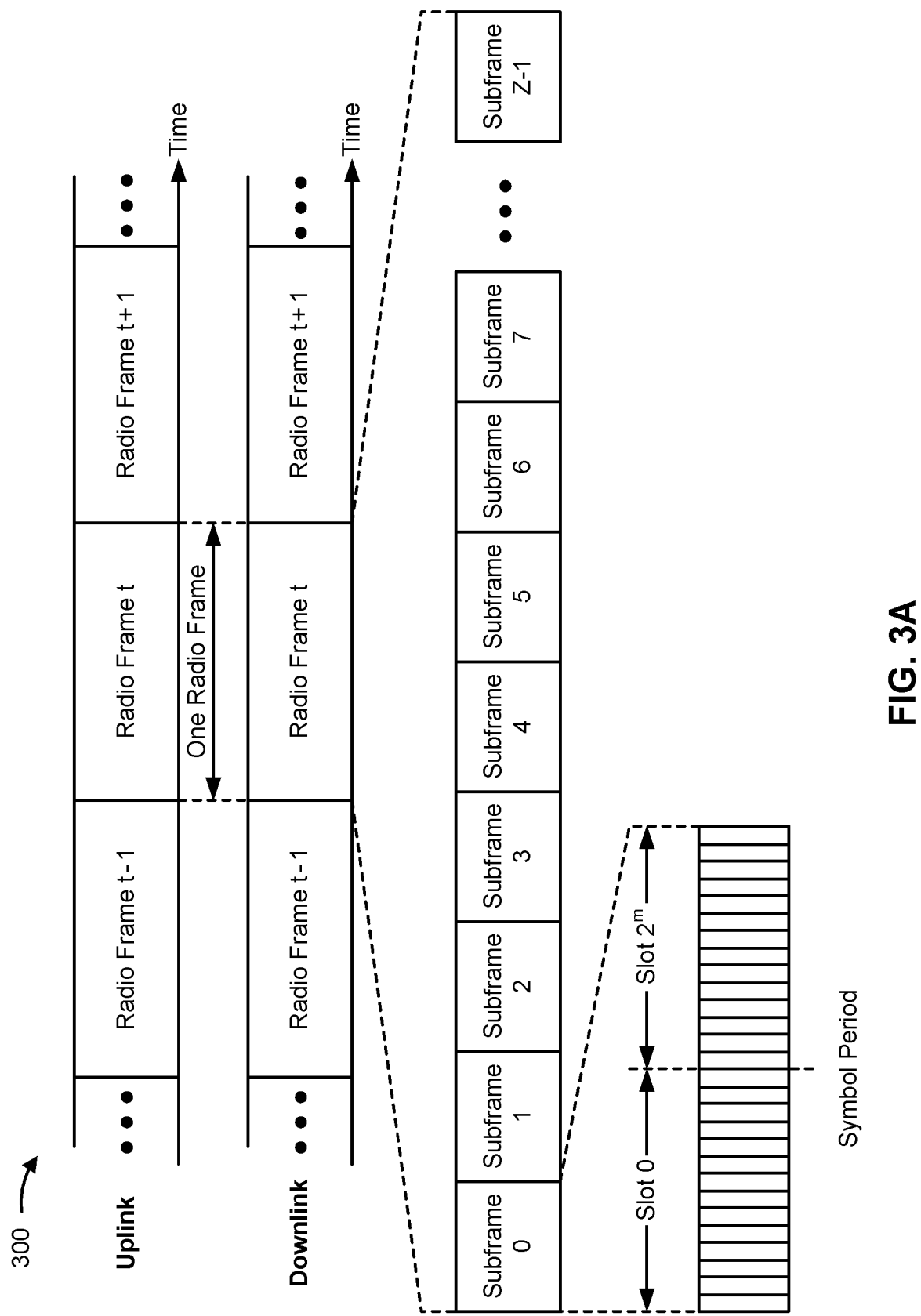
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

In some aspects, a subset of symbols included in a slot may be included in a resource block of the slot (such as slot 0 or slot $2^m$ shown in FIG. 3A). In some aspects, one or more UEs may transmit control information, data, reference signals, and/or the like in one or more resource blocks of a slot. For example, a UE may transmit a DMRS (e.g., that is generated by cyclic shifting a DMRS sequence) in a resource block of a PUCCH. The DMRS may be multiplexed in the resource block with other DMRSs that are transmitted from other UEs depending on the PUCCH format of the PUCCH. For example, if the PUCCH is PUCCH format 4, up to four DMRSs may be multiplexed in the same resource block.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
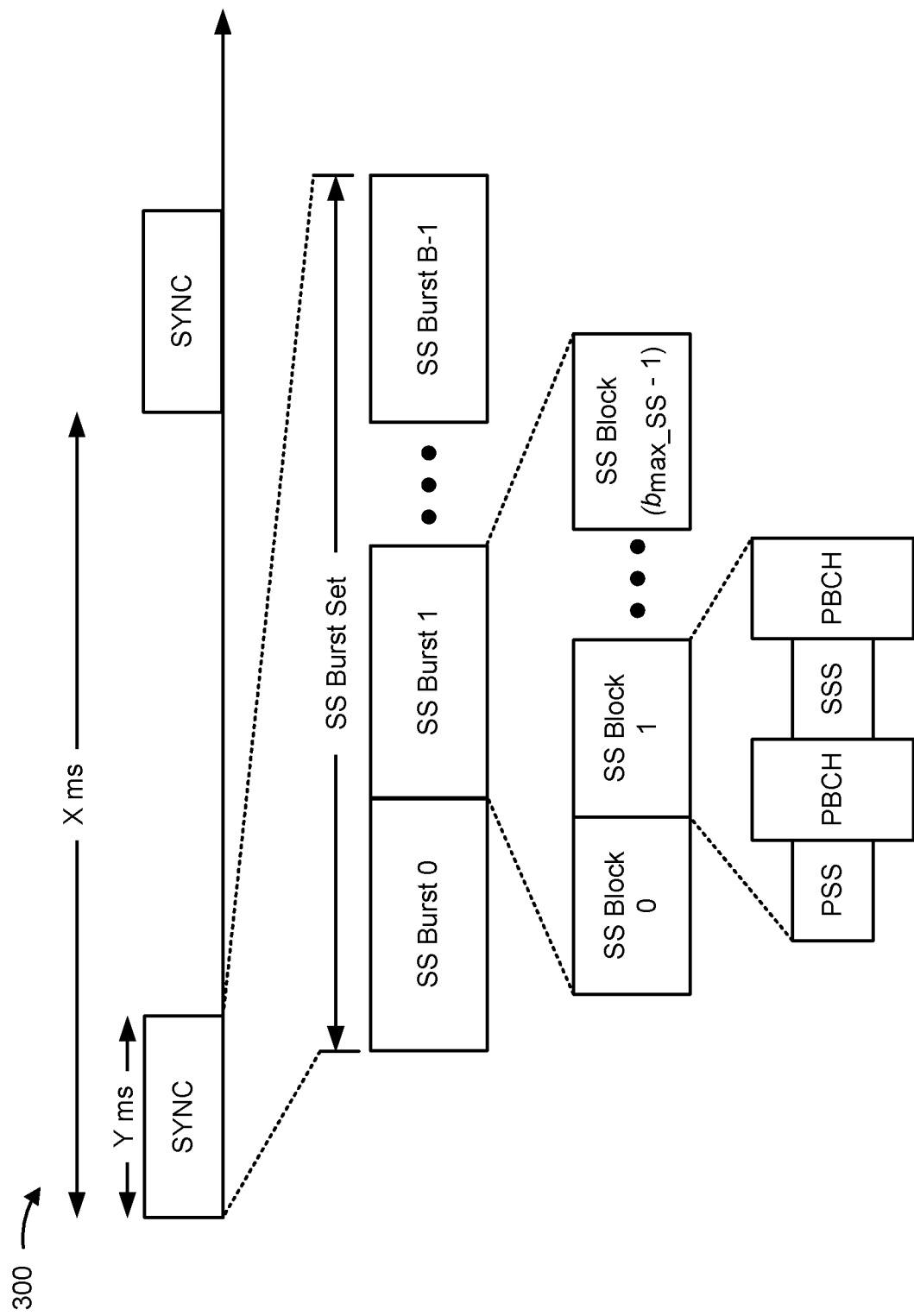
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
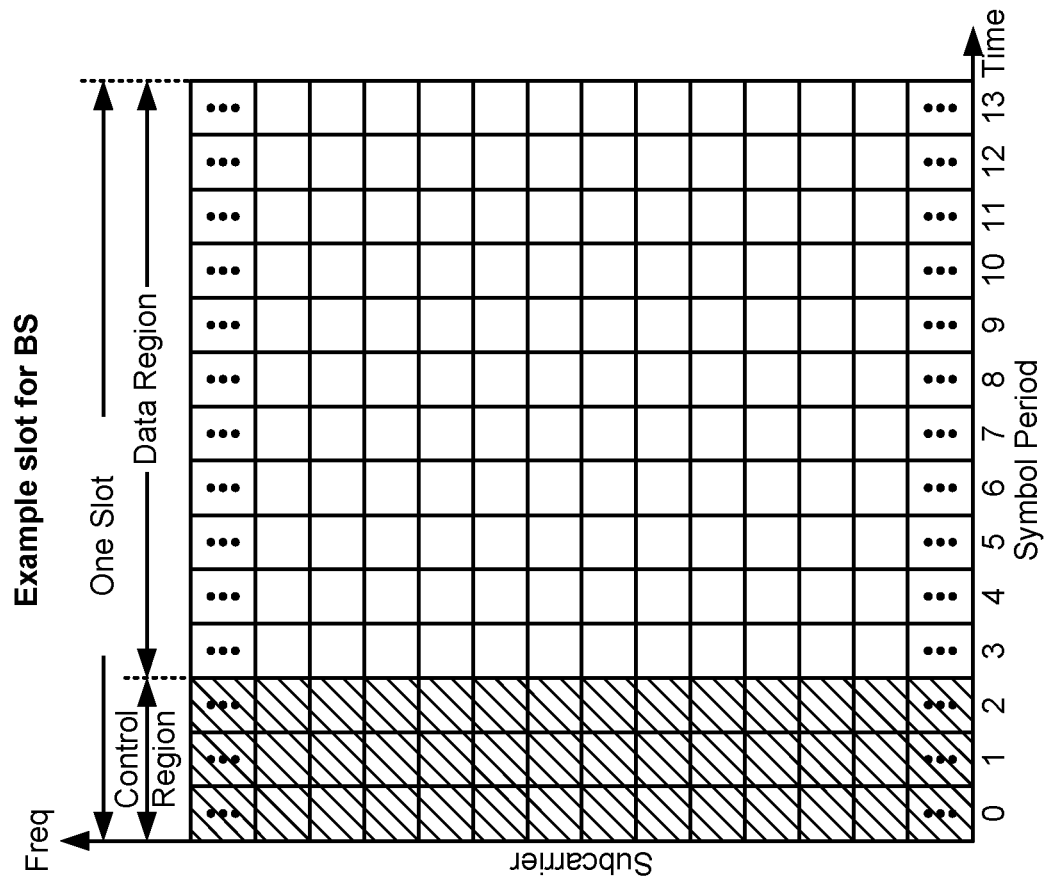
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, one or more UEs may transmit control information, data, reference signals, and/or the like in one or more resource blocks of a slot. For example, a UE may transmit a DMRS (e.g., that is generated by cyclic shifting a DMRS sequence) in a resource block of a PUCCH. The DMRS may be multiplexed in the resource block with other DMRSs that are transmitted from other UEs depending on the PUCCH format of the PUCCH. For example, if the PUCCH is PUCCH format 4, up to four DMRSs may be multiplexed in the same resource block.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

A UE may transmit control information and/or data to a BS on a PUCCH. The control information and/or data may include scheduling requests (SRs) for physical uplink shared channel (PUSCH) resources, hybrid automatic repeat request (HARD) information (e.g., acknowledgment (ACK) or negative acknowledgement (NACK) of a downlink communication), channel quality indicator (CQI) information, channel state information (CSI) reports, and/or the like. The UE may transmit the control information and/or data in one or more uplink communications (e.g., uplink control information (UCI) communications) on the PUCCH.

To facilitate the BS in demodulating the uplink communications, the UE may also transmit a DMRS to the BS on the PUCCH. The DMRS may include a reference signal that the BS may use to estimate channel properties of the PUCCH. The BS may perform one or more measurements of the DMRS and may determine whether the results of the one or more measurements satisfy corresponding thresholds for successful DMRS reception. If the BS determines that the DMRS was received successfully, the BS may proceed with demodulating and decoding the uplink communications.

Moreover, the BS may use DMRSs transmitted from a plurality of UEs to distinguish and separate signals from different UEs that transmit on a PUCCH using the same time domain and/or frequency domain resources. In this case, the UEs may generate DMRSs by modulating a binary sequence (which may be referred to as a DMRS sequence), shifting (e.g., cyclic shifting) the DMRS sequence based at least in part on respective cyclic shift indexes, performing a discrete Fourier transform (DFT) on the shifted DMRS sequence, mapping the elements included in the DMRS sequence to respective frequency tones in a resource block (RB), and modulating the frequency tones (e.g., using CP-OFDM and/or another type of modulation). A DMRS sequence may include an initial or seed sequence that comprises various types of sequences, such as a Zadoff-Chu sequence, a computer-generated binary sequence, a Gold sequence (or Gold code), and/or the like. In some cases, the DMRS sequence that the UE may use to generate the DMRS may be selected based at least in part on a format of the PUCCH (e.g., PUCCH format 1, 2, 3, 4, and/or the like). Moreover, the UE may select the cyclic shift index from a group of cyclic shift indexes based at least in part on an orthogonal cover code index (occ-index) associated with the UE.

Certain groups of cyclic shift indexes may result in good auto-correlation performance when used with a particular type of DMRS sequence (e.g., may result in relatively low auto-correlation between shifted versions of the DMRS sequence). For example, in 3GPP Release 15, a group of cyclic shift indexes (0,3,6,9) has been selected for a length-12 DMRS sequence for PUCCH format 4, which may include a plurality of quadrature phase shift keying (QPSK) symbols. This group of cyclic shift indexes has shown to produce zero auto-correlation when used with the Release 15 length-12 DMRS sequence due to the DMRS sequence being generated in the frequency domain and being flat in frequency (e.g., the magnitude of the amplitude of the values in the DMRS sequence are flat across different frequency tones). For example, the cyclic shift indexes (0,3,6,9), when used with the Release 15 length-12 DMRS sequence for PUCCH format 4, may produce auto-correlation values for the DMRS sequence of (1,0,0,0). In other words, versions of the DMRS sequence, that have been cyclically shifted using respective cyclic shift indexes that are spaced apart greater than zero (e.g., the cyclic shifts are not the same) have zero auto-correlation.

Other DMRS sequences may be developed in order to provide increased coverage for UEs in a cell relative to the Release 15 DMRS sequence for PUCCH format 4. For example, DMRS sequences that are based at least in part on pi/2 BPSK modulated Gold sequences and/or pi/2 BPSK modulated computer-generated binary sequences of various lengths may be used to improve cell coverage, in particular for cell-edge UEs. For a pi/2 BPSK modulated DMRS sequence, bit b(i) is mapped to complex-valued modulation symbol d(i) according to $$d(i) = \frac{e^{\frac{j\pi}{2}(i \bmod 2)}}{\sqrt{2}}[(1 - 2b(i)) + j(1 - 2b(i))]$$

These DMRS sequences may be modulated in the time domain such that these DMRS sequences have low peak to average power ratios (PAPRs) relative to the Release 15 DMRS sequence for PUCCH format 4. Accordingly, these DMRS sequences permit UEs to transmit a DMRS, that is generated from these DMRS sequences, with greater transmit power relative to a DMRS that is generated from the Release 15 DMRS sequence for PUCCH format 4. However, these DMRS sequences are not flat in the frequency domain.

FIG. 5 illustrates a table 500 of auto-correlation results for example simulations of 30 different length-12 DMRS sequences that are based at least in part on pi/2 BPSK modulated computer-generated binary sequences for PUCCH transmission. Table 1 below illustrates the example length 12 binary sequences used to generate length 12 DMRS sequence.

TABLE 1

| DMRS Sequence index u | b(0), . . . , b(11) | | | | | | | | | | | |
|---|---|---|---|---|---|---|---|---|---|---|---|---|
| 0  | 0 | 0 | 0 | 0 | 0 | 0 | 1 | 1 | 0 | 1 | 1 | 0 |
| 1  | 0 | 0 | 0 | 0 | 0 | 1 | 0 | 0 | 0 | 1 | 1 | 1 |
| 2  | 0 | 0 | 0 | 0 | 0 | 1 | 1 | 1 | 0 | 1 | 1 | 1 |
| 3  | 1 | 1 | 0 | 1 | 1 | 0 | 1 | 0 | 1 | 0 | 0 | 0 |
| 4  | 1 | 1 | 0 | 0 | 1 | 0 | 1 | 0 | 1 | 0 | 0 | 1 |
| 5  | 1 | 0 | 1 | 1 | 0 | 1 | 0 | 0 | 1 | 0 | 1 | 1 |
| 6  | 0 | 0 | 0 | 1 | 0 | 0 | 1 | 0 | 0 | 0 | 1 | 0 |
| 7  | 0 | 1 | 0 | 0 | 0 | 1 | 0 | 0 | 1 | 0 | 0 | 0 |
| 8  | 1 | 0 | 1 | 1 | 1 | 1 | 0 | 1 | 1 | 0 | 1 | 1 |
| 9  | 1 | 0 | 1 | 1 | 0 | 1 | 1 | 1 | 0 | 0 | 0 | 0 |
| 10 | 1 | 0 | 1 | 1 | 0 | 1 | 0 | 0 | 0 | 1 | 1 | 0 |
| 11 | 1 | 0 | 1 | 0 | 0 | 1 | 0 | 0 | 1 | 0 | 1 | 0 |
| 12 | 1 | 1 | 0 | 0 | 0 | 0 | 0 | 1 | 1 | 1 | 1 | 0 |
| 13 | 0 | 1 | 0 | 0 | 0 | 1 | 1 | 0 | 1 | 0 | 1 | 1 |
| 14 | 0 | 0 | 0 | 0 | 0 | 1 | 1 | 0 | 0 | 0 | 1 | 1 |
| 15 | 0 | 0 | 0 | 0 | 0 | 1 | 0 | 0 | 1 | 0 | 0 | 1 |
| 16 | 0 | 0 | 1 | 0 | 0 | 1 | 0 | 0 | 0 | 0 | 0 | 1 |
| 17 | 0 | 0 | 0 | 0 | 0 | 1 | 1 | 0 | 1 | 1 | 1 | 0 |
| 18 | 0 | 0 | 0 | 1 | 1 | 1 | 1 | 1 | 0 | 0 | 0 | 1 |
| 19 | 1 | 0 | 0 | 0 | 1 | 0 | 0 | 0 | 0 | 0 | 1 | 1 |
| 20 | 0 | 1 | 1 | 1 | 1 | 0 | 1 | 0 | 1 | 1 | 1 | 1 |
| 21 | 0 | 1 | 1 | 1 | 0 | 1 | 0 | 0 | 1 | 1 | 0 | 1 |
| 22 | 0 | 1 | 1 | 1 | 1 | 1 | 0 | 0 | 1 | 0 | 0 | 0 |
| 23 | 0 | 1 | 1 | 1 | 0 | 0 | 0 | 0 | 1 | 0 | 0 | 0 |
| 24 | 0 | 0 | 1 | 1 | 1 | 1 | 1 | 1 | 1 | 0 | 0 | 0 |
| 25 | 0 | 1 | 1 | 1 | 0 | 0 | 1 | 1 | 0 | 1 | 0 | 0 |
| 26 | 0 | 1 | 1 | 0 | 1 | 1 | 1 | 0 | 1 | 1 | 1 | 1 |
| 27 | 0 | 1 | 1 | 1 | 1 | 1 | 0 | 0 | 0 | 1 | 1 | 1 |
| 28 | 0 | 1 | 1 | 1 | 0 | 0 | 0 | 0 | 0 | 1 | 1 | 1 |
| 29 | 0 | 1 | 1 | 1 | 0 | 1 | 1 | 1 | 0 | 1 | 1 | 1 |

Table 500 indicates that the average auto-correlation for the 30 DMRS sequences using cyclic shift indexes (0,3,6,9) for PUCCH are respectively (1,0.144,0.278,0.144). Thus, the example simulation results shown in table 500 indicate that the cyclic shift indexes (0,3,6,9) may result in poor auto-correlation performance when used with pi/2 BPSK modulated DMRS sequences for PUCCH format 4. The unexpectedly poor auto-correlation performance may be due to the differences between DMRS multiplexing structures and data multiplexing structures of PUSCH and PUCCH (e.g., due to PUCCH having an orthogonal data structure whereas PUSCH has a data structure that is overlaid), may be due to pi/2 BPSK modulated DMRS sequences being flat in the frequency domain, and/or the like.

In particular, four DMRSs may first be separated in the frequency domain using different frequency combs (e.g., if four UEs are transmitting DMRS on the same resources, two of the four UEs may use even frequency tones while the other two UEs may use odd frequency tones). Therefore, on the same set of frequency tones, 2 UEs are supported, instead of 4. Thus, the interferences caused by using cyclic shifted versions of DMRS sequences for PUSCH may be smaller than for PUCCH (e.g., for two UEs using the same set of tones for PUSCH compared with four UEs using same set of tones for PUCCH).

Moreover, previous uses of PUSCH may have shown that non-orthogonality may not cause intolerable degradations to DMRS performance. It may be expected that, for PUCCH (which offers orthogonality), DMRS performance may be better relative to PUSCH because, for PUSCH, the data from different UEs may occupy the same set of frequency tones, whereas for PUCCH format 4, the data for different UEs will occupy different sets of frequency domain tones and are orthogonal to each other. However, and as shown in table 500 in FIG. 5, the performance of PUCCH transmission is more sensitive to non-orthogonal DMRS than that of PUSCH. Moreover, reliability parameters for PUSCH and PUCCH may be different. For example, PUCCH transmissions may rely on a higher reliability than PUSCH transmission (e.g., PUSCH may rely on a 0.1 block error rate whereas PUCCH may rely on a 0.001 block error rate). As a consequence of these differences, the orthogonality of DMRSs between different UEs has less of an impact on performance of PUSCH transmissions compared to PUCCH transmissions, since the bottleneck for the performance lies in the data part and PUCCH relies on a higher reliability. While it may have been previously assumed that implementations for PUSCH could be reused for PUCCH, further investigation indicates that a redesign of cyclic shifts for PUCCH may be implemented to improve DMRS performance in PUCCH.

The poor auto-correlation performance between shifted versions of DMRS sequences that are used with pi/2 BPSK modulation may, in turn, result in decreased orthogonality between DMRSs that are generated from the shifted versions of DMRS sequences. Since PUCCH format 4 permits multiplexing of DMRSs, transmitted by a plurality of UEs, in the same resource block (RB), the decreased orthogonality between DMRSs may cause degraded performance of the multiplexed DMRSs, which in turn may result in the BS being unable to demodulate and/or decode corresponding uplink transmissions.

Some aspects described herein provide techniques and apparatuses for cyclic shift configuration for PUCCH with pi/2 BPSK modulation. In some aspects, a BS may configure a group of cyclic shift indexes for one or more DMRS sequences that are modulated with pi/2 BPSK modulation. The BS may transmit an indication of the group of cyclic shift indexes to a UE (e.g., in a signaling communication), and the UE may select a cyclic shift index, from the group of cyclic shift indexes, for shifting a DMRS sequence to generate a DMRS that may be transmitted to the BS with pi/2 BPSK modulation. The BS may configure the group of cyclic shift indexes such that the cyclic shift indexes included in the group are selected to provide good auto-correlation performance with the one or more DMRS sequences (e.g., relative to the cyclic shift indexes (0,3,6,9) used in Release 15). For example, the BS may configure a group of cyclic shifts indexes, that is to be used by UEs to shift a plurality of different DMRS sequences (e.g., the DMRS sequences illustrated in Table 1 above), such that the gaps (e.g., cyclic gaps) between the cyclic shift indexes included in the group are greater than 2 and such that none of the gaps between cyclic shift indexes is 6, which effectively prevents the use of cyclic shift index 6 (e.g., the cyclic shift index with the highest average auto-correlation). As another example, the BS may configure respective groups of cyclic shift indexes for different DMRS sequences (e.g., based at least in part on the example simulations illustrated in FIG. 5) such that the cyclic shift indexes with the lowest auto-correlations are selected.

In this way, the configured groups of cyclic shift indexes may reduce auto-correlation for pi/2 BPSK modulated DMRS sequences relative to the cyclic shift indexes (0,3,6, 9) that have been selected for the Release 15 DMRS sequence for PUCCH format 4. This increases the orthogonality of DMRSs that are generated based at least in part on pi/2 BPSK modulated DMRS sequences, which in turn improves the ability of UEs to multiplex DMRSs for PUCCH format 4.

Figure 6A:
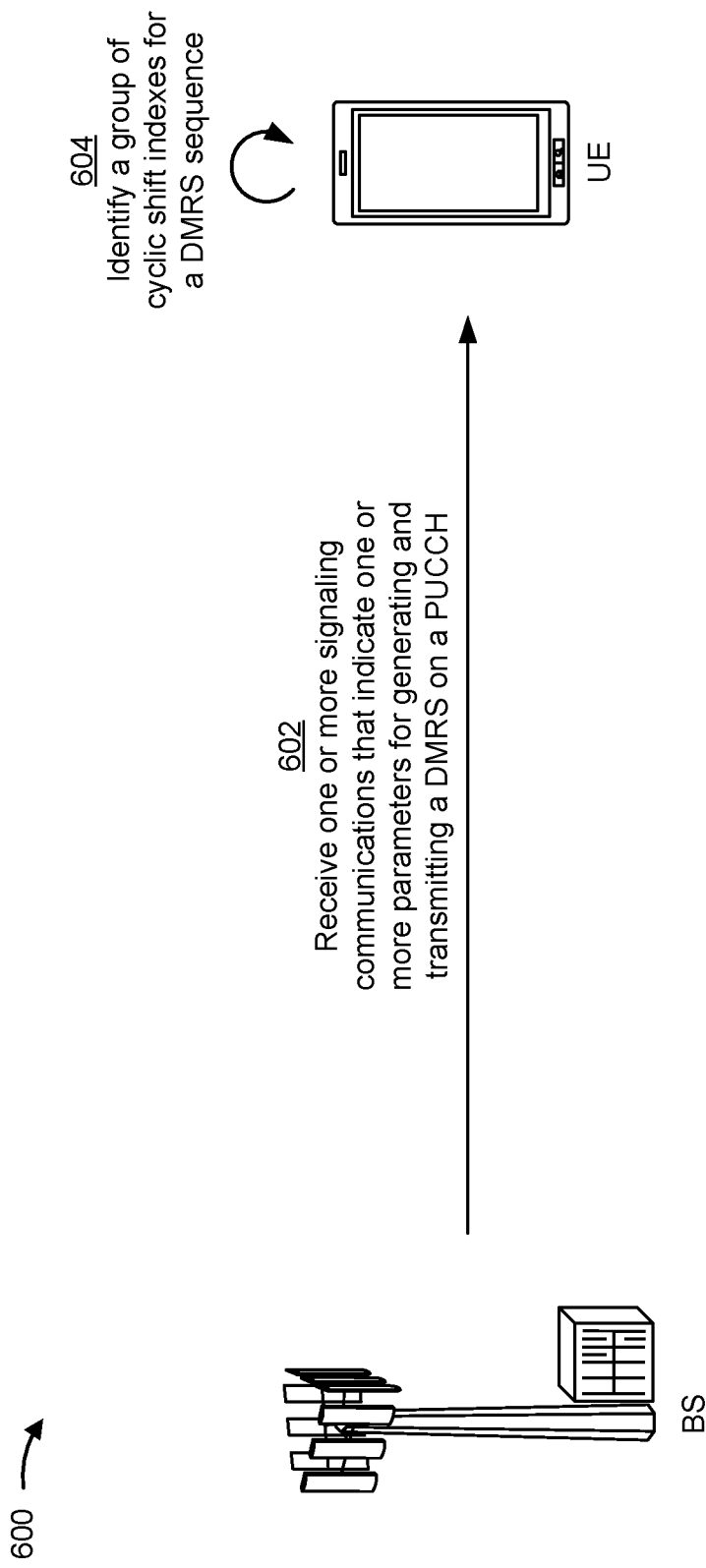
FIGS. 6A and 6B are diagrams illustrating one or more examples of cyclic shift configuration for physical uplink control channel (PUCCH) with pi/2 binary phase shift key (BPSK) modulation, in accordance with various aspects of the present disclosure.
Figure 6B:
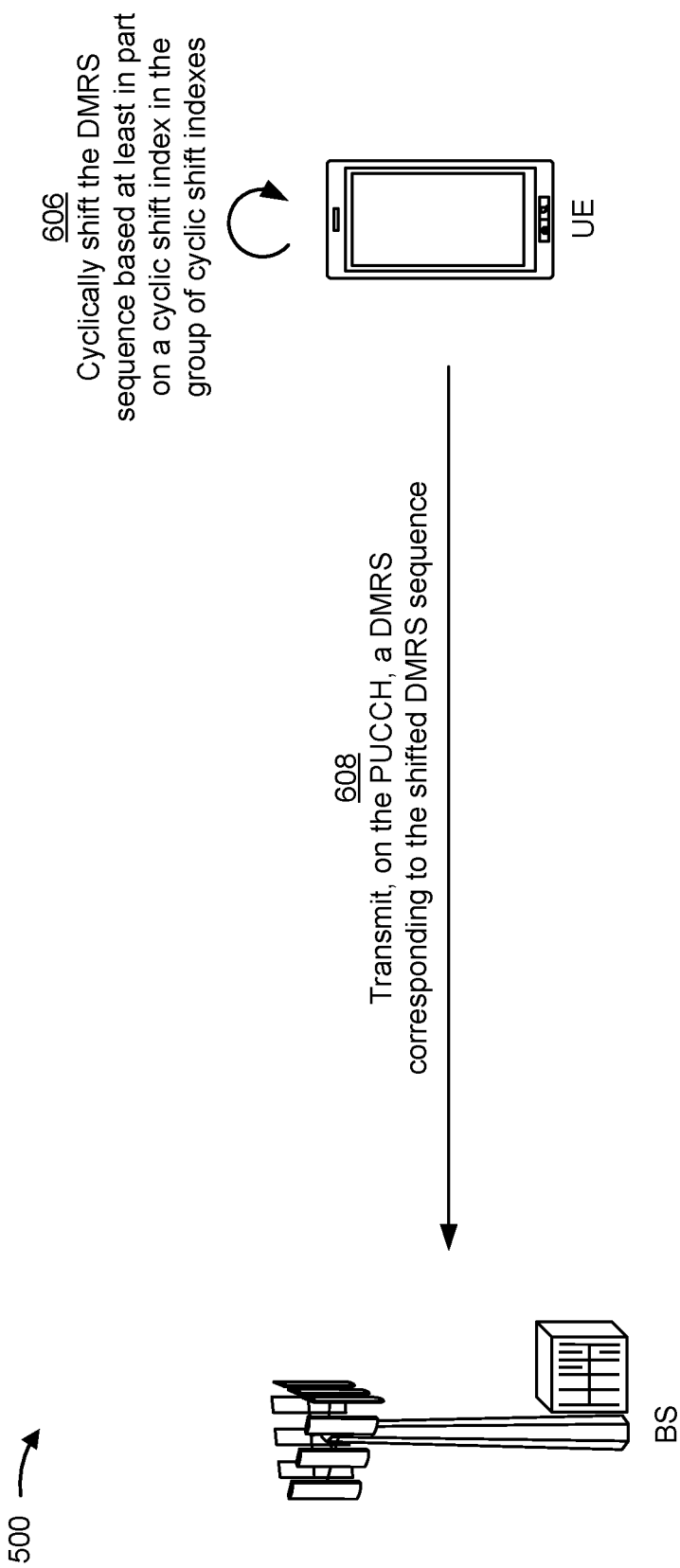

FIGS. 6A and 6B are diagrams illustrating one or more examples 600 of cyclic shift configuration for PUCCH with pi/2 BPSK modulation, in accordance with various aspects of the present disclosure. As shown in FIGS. 6A and 6B, examples 600 may include communication between a BS (e.g., BS 110) and a UE (e.g., UE 120). The BS and the UE may be included in a wireless network (e.g., wireless network 100). The communication between the BS and the UE may include the UE transmitting uplink communications to the BS. In some aspects, the UE may transmit uplink communications on an uplink channel such as a PUSCH, a PUCCH, and/or the like.

To facilitate the BS in demodulating the uplink communications, the UE may also transmit a DMRS to the BS on a PUCCH. The DMRS may include a reference signal that the BS may use to estimate channel properties of the PUCCH. The BS may perform one or more measurements of the DMRS and may determine whether the results of the one or more measurements satisfy corresponding thresholds for successful DMRS reception. If the BS determines that the DMRS was received successfully, the BS may proceed with demodulating and decoding the uplink communications.

The UE may generate a DMRS by shifting (e.g., cyclic shifting) a DMRS sequence based at least in part on a cyclic shift index. The cyclic shift index may correspond to a quantity of positions that the DMRS sequence is to be shifted (e.g., from the base or original binary sequence of the DMRS sequence). For example, a cyclic shift index 0 may indicate that the DMRS sequence is to be shifted by 0 positions, a cyclic shift index 1 may indicate that the DMRS sequence is to be shifted by 1 position, and so on.

As shown in FIG. 6A, and by reference number 602, to configure the UE to transmit the DMRS, the BS may transmit, to the UE, one or more signaling communications that indicate one or more parameters for generating and transmitting the DMRS on the PUCCH. The one or more parameters may include an indication of one or more DMRS sequences, one or more groups of cyclic shift indexes, an occ-index associated with the UE, a PUCCH format, and/or the like. In some aspects, the one or more signaling communications may include a radio resource control (RRC) communication, a medium access control (MAC) control element (MAC-CE) communication, a downlink control information (DCI) communication, and/or the like.

The one or more DMRS sequences may include various types and/or various lengths of DMRS sequences. For example, one or more DMRS sequences may include a pi/2 BPSK modulated Gold sequence (e.g., a Gold sequence that is to be transmitted with pi/2 BPSK modulation), a pi/2 BPSK modulated computer-generated binary sequence (e.g., a computer-generated binary sequence that is to be transmitted with pi/2 BPSK modulation), and/or the like.

In some aspects, the DMRS sequence that the UE is to use to generate the DMRS may be based at least in part on various factors. In some aspects, the UE may use a DMRS sequence, from the one or more DMRS sequences indicated in the signaling communication, based at least in part on the one or more signaling communications explicitly specifying which DMRS sequence that the UE is to use. In some aspects, the UE may use a DMRS sequence based at least in part on the capability of the UE (e.g., the capability of the UE to generate particular types and/or lengths of DMRS sequences). In some aspects, the UE may use a DMRS sequence based at least in part on a location of the UE within a cell of the BS (e.g., the UE may use a particular type of DMRS sequence depending on whether the UE is located near the edge or center of the cell), and/or the like. As an example, the BS may configure the UE to use a first DMRS sequence of a first type and/or first length when the UE is located near the edge of the cell (e.g., a 30-bit or longer pi/2 BPSK modulated Gold sequence), and a second DMRS sequence of a second type and/or second length when the UE is located near the center of the cell (e.g., a 24-bit or shorter pi/2 BPSK modulated computer-generated binary sequence).

As further shown in FIG. 6A, and by reference number 604, the UE may identify a group of cyclic shift indexes for the DMRS sequence. In some aspects, the UE may identify the group of cyclic shift indexes from the one or more groups of cyclic shift indexes indicated in the one or more signaling communications.

In some aspects, the one or more groups of cyclic shift indexes may include a single group of cyclic shift indexes. In this case, the one or more signaling communications may indicate the group of cyclic shift indexes that is to be used with all types of DMRS sequences included in the one or more DMRS sequences. In this case, the UE may select the cyclic shift index from the group of cyclic shift indexes to generate the DMRS. The BS may select the cyclic shift indexes, that are included in the group of cyclic shift indexes, based at least in part on respective average auto-correlation values for all possible cyclic shift indexes across the one or more DMRS sequences (or across all possible DMRS sequences). As an example, for the example length-12 DMRS sequences associated with the auto-correlation results illustrated in table 500 of FIG. 5, the BS may select the cyclic shift indexes such that cyclic gaps between cyclic shift indexes included in the group of cyclic shift indexes is at least 2 (e.g., to provide sufficient spacing between cyclic shift indexes) and not 6 (e.g., to avoid cyclic shift index 6, which exhibits the highest average auto-correlation). In this case, the BS may select cyclic shift indexes (0,2,5,10) or (0,2,7,10) as an example group of cyclic shift indexes.

In some aspects, the one or more groups of cyclic shift indexes may include a plurality of groups of cyclic shift indexes and the one or more DMRS sequences may include a plurality of DMRS sequences. In this case, the one or more signaling communications may indicate that respective groups of cyclic shift indexes are to be used with respective DMRS sequences and/or respective subsets of DMRS sequences of the one or more DMRS sequences. The UE may identify the group of cyclic shift indexes based at least in part on the DMRS sequence that the UE is to use to generate the DMRS.

The one or more signaling communications may explicitly indicate an association between a group of cyclic shift indexes of the plurality of groups of cyclic shift indexes and one or more DMRS sequences of the plurality of DMRS sequences. For example, the one or more signaling communications may indicate respective DMRS sequence indexes associated with the plurality of DMRS sequences, and may explicitly indicate that a group of cyclic shift indexes is to be used with a particular DMRS sequence index. In some aspects, the one or more signaling communications may specify a formula and/or one or more parameters for determining which group of cyclic shift indexes is associated with a particular DMRS sequence. The one or more parameters may include the DMRS sequence index of a DMRS sequence, the occ-index of the UE, and/or the like.

In some aspects, the BS may select the cyclic shift indexes, that are included in a group of cyclic shift indexes of the plurality of groups of cyclic shift indexes, based at least in part on the DMRS sequence associated with the group of cyclic shift indexes. The BS may select the cyclic shift indexes based at least in part on respective auto-correlation values for all of the cyclic shift indexes of the DMRS sequence. For example, the BS may select the cyclic shift indexes that have the lowest auto-correlation for the DMRS sequence, while maintaining sufficient spacing cyclic shift indexes (e.g., a minimum cyclic gap of at least 2). As an example, for the example 12-bit length DMRS sequences associated with the auto-correlation results illustrated in table 500 of FIG. 5, the BS may select cyclic shift indexes (0,2,6,10) as an example group of cyclic shift indexes for DMRS sequence index 8 since the resulting group of cyclic shift indexes exhibits zero auto-correlation. As another example, the BS may select cyclic shift indexes (0,2,5,10) or (0,2,7,10) as another example group an example group of cyclic shift indexes for DMRS sequence index 0 since these resulting groups of cyclic shift indexes exhibit zero auto-correlation.

As shown in FIG. 6B, and by reference number 606, the UE may shift the DMRS sequence based at least in part on a cyclic shift index in the group of cyclic shift indexes. In some aspects, the UE may identify the cyclic shift index, from the selected group of cyclic shift indexes, based at least in part on the occ-index indicated in the one or more signaling communications. For example, if the one or more signaling communications indicates that the PUCCH is PUCCH format 4 (e.g., a PUCCH in which DMRSs from a plurality of UEs is to be multiplexed into a single RB), the UE may use the occ-index associated with the UE to perform a lookup in a PUCCH format 4 table or data store to identify the cyclic shift index from the selected group of cyclic shift indexes.

In some aspects, the occ-index, associated with the UE, may be based at least in part on a PUCCH format 4 configured multiplexing capacity for the group of cyclic shift indexes $N_{SF}^{PUCCH,4}$. For example, if the PUCCH format 4 configured multiplexing capacity for the group of cyclic shift indexes is equal to 4, then four DMRSs (e.g., from four different UEs) may be multiplexed in the same RB. In this case, the occ-index associated with the UE may be one of four available occ-indexes that correspond to respective DMRS sequence indexes. As another example, if the PUCCH format 4 configured multiplexing capacity for the group of cyclic shift indexes is equal to 2, then two DMRSs (e.g., from two different UEs) may be multiplexed in the same RB. In this case, the occ-index associated with the UE may be one of two available occ-indexes that correspond to respective DMRS sequence indexes. Tables 2 and 3 below illustrate example combinations of PUCCH format 4 configured multiplexing capacity, occ-indexes, and DMRS sequence indexes.

TABLE 2

| Orthogonal sequence index n | Cyclic shift index $m_0$ | |
|---|---|---|
| | $N_{SF}^{PUCCH,4} = 2$ | $N_{SF}^{PUCCH,4} = 4$ |
| 0 | 0 | 0 |
| 1 | 5 | 5 |
| 2 | — | 2 |
| 3 | — | 10 |

TABLE 3

| Orthogonal sequence index n | Cyclic shift index $m_0$ | |
|---|---|---|
| | $N_{SF}^{PUCCH,4} = 2$ | $N_{SF}^{PUCCH,4} = 4$ |
| 0 | 0 | 0 |
| 1 | 7 | 7 |
| 2 | — | 2 |
| 3 | — | 10 |

To shift the DMRS sequence based at least in part on the identified cyclic shift index, the UE may cyclic shift the pi/2 BPSK modulated base or original binary sequence of the DMRS sequence by a quantity of positions that corresponds to the cyclic shift index. For example, if the selected cyclic shift index is 5, the UE may shift the base or original binary sequence of the DMRS sequence by 5 positions.

As further shown in FIG. 6B, and by reference number 608, the UE may transmit a DMRS that corresponds to the shifted DMRS sequence (e.g., the DMRS sequence that is shifted based at least in part on the identified cyclic shift index). The UE may transmit the DMRS on the PUCCH and with pi/2 BPSK modulation. For example, the UE may map the DMRS sequence to one or more symbols using pi/2 BPSK modulation. In some aspects, if the PUCCH is PUCCH format 4, the UE may transmit the DMRS in an RB along with one or more DMRSs, transmitted from one or more other UEs, that are multiplexed with the DMRS in the RB.

In this way, the BS may configure a group of cyclic shift indexes for one or more DMRS sequences that are modulated with pi/2 BPSK modulation. The BS may transmit an indication of the group of cyclic shift indexes to the UE, and the UE may select a cyclic shift index, from the group of cyclic shift indexes, for shifting a DMRS sequence to generate a DMRS that may be transmitted to the BS with pi/2 BPSK modulation. The BS may configure the group of cyclic shift indexes such that the cyclic shift indexes included in the group are selected to provide good auto-correlation performance with the one or more DMRS sequences (e.g., relative to the Release 15 DMRS sequence for PUCCH format 4). In this way, the configured groups of cyclic shift indexes may reduce auto-correlation for pi/2 BPSK modulated DMRS sequences relative to the cyclic shift indexes (0,3,6,9) that have been selected for the Release 15 DMRS sequence for PUCCH format 4. This increases the orthogonality of DMRSs that are generated based at least in part on pi/2 BPSK modulated DMRS sequences, which in turn improves the ability of UEs to multiplex DMRSs for PUCCH format 4.

As indicated above, FIGS. 6A and 6B are provided as one or more examples. Other examples may differ from what is described with respect to FIGS. 6A and 6B.

Figure 7:
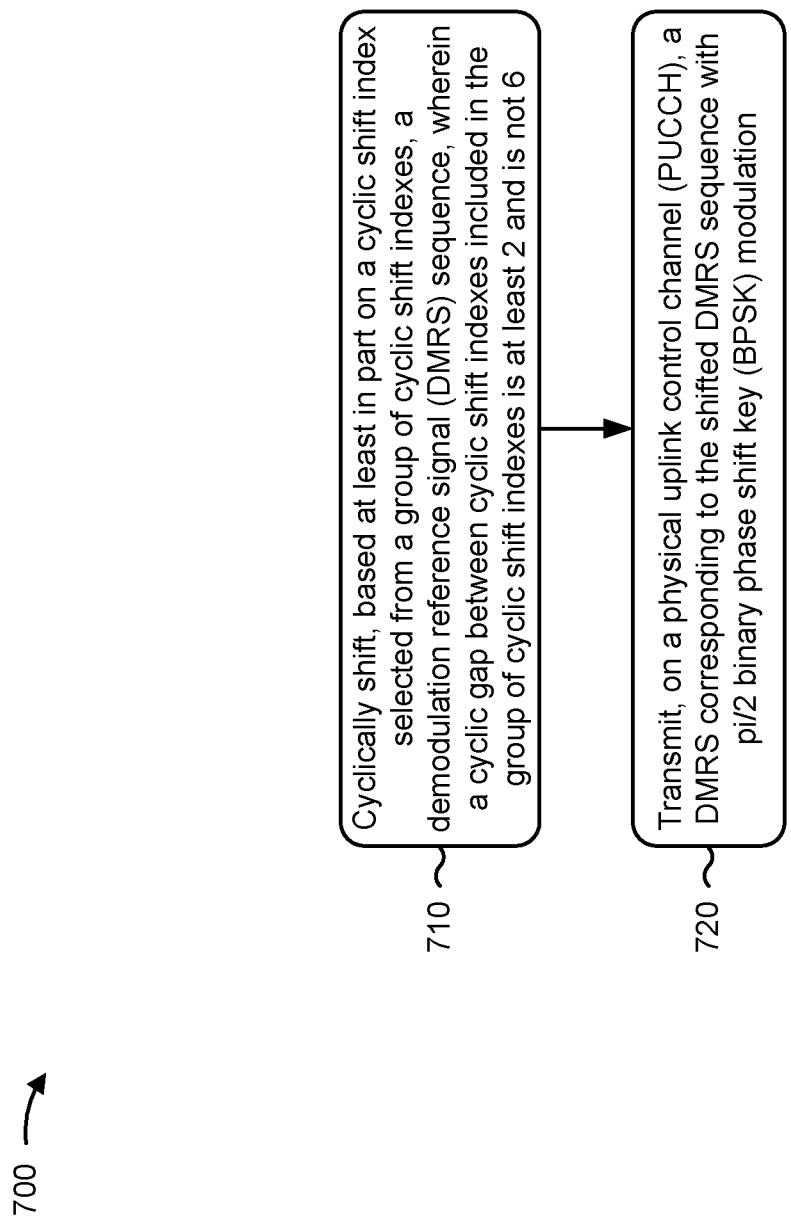
FIGS. 7 and 8 are diagrams illustrating example processes performed, for example, by a UE, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs operations associated with cyclic shift configuration for PUCCH with pi/2 BPSK modulation.

As shown in FIG. 7, in some aspects, process 700 may include cyclically shifting, based at least in part on a cyclic shift index selected from a group of cyclic shift indexes, a DMRS sequence, wherein a cyclic gap between cyclic shift indexes included in the group of cyclic shift indexes is at least 2 and not 6 (block 710). For example, the UE (e.g., using modulator 254, transmit processor 264, TX MIMO processor 266, controller/processor 280, memory 282, and/or the like) may cyclically shift, based at least in part on a cyclic shift index selected from a group of cyclic shift indexes, a DMRS sequence, as described above, for example, with reference to FIGS. 5, 6A, and/or 6B. In some aspects, a cyclic gap between cyclic shift indexes included in the group of cyclic shift indexes is at least 2 and is not 6.

As further shown in FIG. 7, in some aspects, process 700 may include transmitting, on a PUCCH, a DMRS corresponding to the shifted DMRS sequence with pi/2 BPSK modulation (block 720). For example, the UE (e.g., using modulator 254, transmit processor 264, TX MIMO processor 266, controller/processor 280, memory 282, and/or the like) may transmit, on a PUCCH, a DMRS corresponding to the shifted DMRS sequence with pi/2 BPSK modulation, as described above, for example, with reference to FIGS. 5, 6A, and/or 6B.

Process 700 may include additional aspects, such as any single aspect or any combination of aspects described below and/or in connection with one or more other processes described elsewhere herein.

In a first aspect, the PUCCH is a PUCCH format 4. In a second aspect, alone or in combination with the first aspect, transmitting the DMRS comprises transmitting the DMRS on the PUCCH in a resource block (RB), the DMRS being multiplexed, in the RB, with one or more other DMRSs transmitted from one or more other UEs. In a third aspect, alone or in combination with one or more of the first and second aspects, process 700 further comprises selecting the cyclic shift index from the group of cyclic shift indexes based at least in part on an orthogonal cover code index (occ-index) associated with the UE.

In a fourth aspect, alone or in combination with one or more of the first through third aspects, process 700 further comprises receiving an indication of the occ-index, and selecting the cyclic shift index from the group of cyclic shift indexes comprises selecting the cyclic shift index from the group of cyclic shift indexes based at least in part on the indication of the occ-index. In a fifth aspect, alone or in combination with one or more of the first through fourth aspects, receiving the indication of the occ-index comprises receiving the indication of the occ-index in at least one of an RRC communication, a MAC-CE communication, or a DCI communication.

In a sixth aspect, alone or in combination with one or more of the first through fifth aspects, the group of cyclic shift indexes is associated with a plurality of DMRS sequences and the plurality of DMRS sequences are based at least in part on respective pi/2 BPSK modulated computer-generated binary sequences. In a seventh aspect, alone or in combination with one or more of the first through sixth aspects, the group of cyclic shift indexes includes cyclic shift indexes (0,2,5,10) or cyclic shift indexes (0,2,7,10) for a PUCCH format 4 configured multiplexing capacity equal to 4. In an eighth aspect, alone or in combination with one or more of the first through seventh aspects, the group of cyclic shift indexes includes cyclic shift indexes (0,5) or cyclic shift indexes (0,7) for a PUCCH format 4 configured multiplexing capacity equal to 2.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
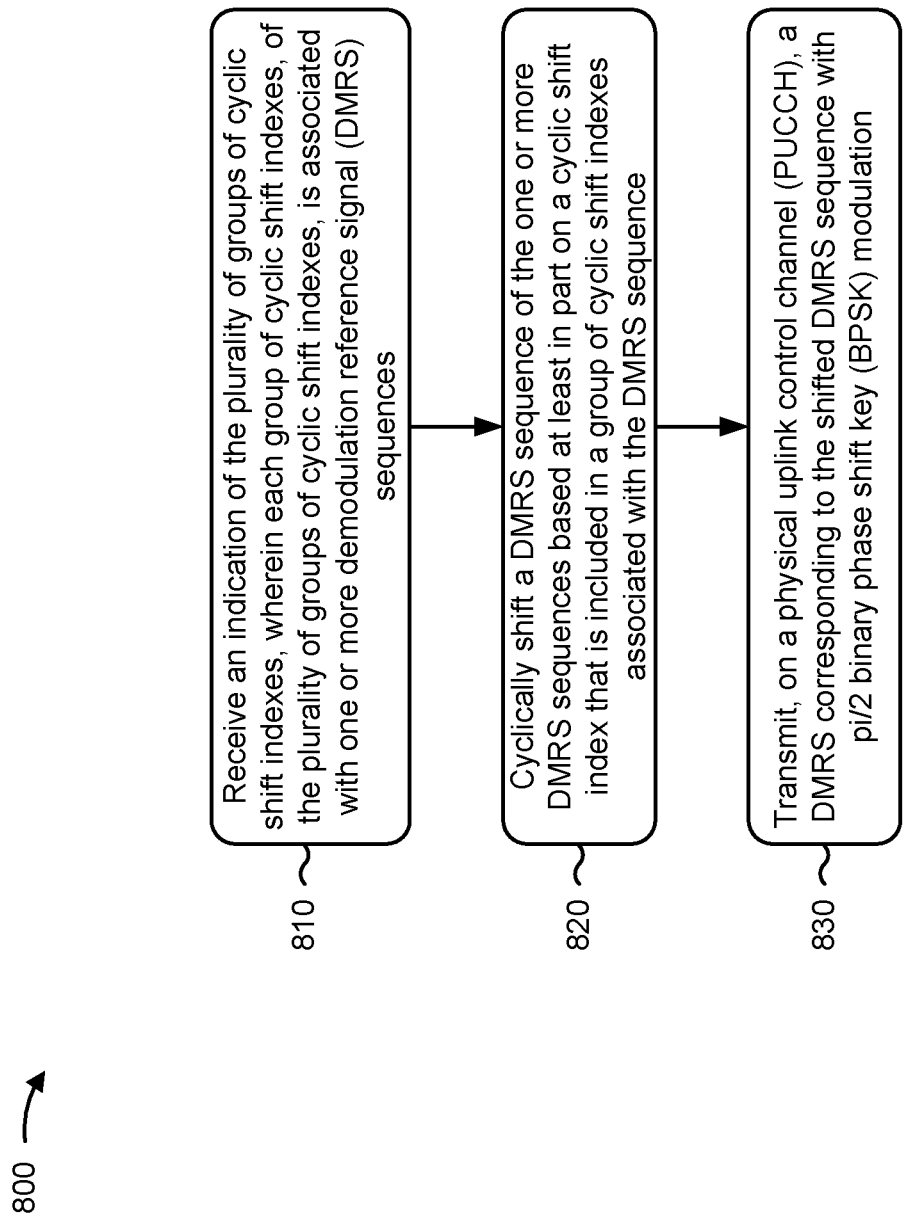

FIG. 8 is a diagram illustrating an example process 800 performed, for example, by a UE, in accordance with various aspects of the present disclosure. Example process 800 is an example where a UE (e.g., UE 120) performs operations associated with cyclic shift configuration for PUCCH with pi/2 BPSK modulation.

As shown in FIG. 8, in some aspects, process 800 may include receiving an indication of a plurality of groups of cyclic shift indexes, wherein each group of cyclic shift indexes, of the plurality of groups of cyclic shift indexes, is associated with one or more DMRS sequences (block 810). For example, the UE (e.g., using demodulator 254, MIMO detector 256, receive processor 258, controller/processor 280, memory 282, and/or the like) may receive an indication of a plurality of groups of cyclic shift indexes, as described above, for example, with reference to FIGS. 5, 6A, and/or 6B. In some aspects, each group of cyclic shift indexes, of the plurality of groups of cyclic shift indexes, is associated with one or more DMRS sequences.

As further shown in FIG. 8, in some aspects, process 800 may include cyclically shifting a DMRS sequence of the one or more DMRS sequences based at least in part on a cyclic shift index that is included in a group of cyclic shift indexes associated with the DMRS sequence (block 820). For example, the UE (e.g., using modulator 254, transmit processor 264, TX MIMO processor 266, controller/processor 280, memory 282, and/or the like) may cyclically shift a DMRS sequence of the one or more DMRS sequences based at least in part on a cyclic shift index that is included in a group of cyclic shift indexes associated with the DMRS sequence, as described above, for example, with reference to FIGS. 5, 6A, and/or 6B.

As further shown in FIG. 8, in some aspects, process 800 may include transmitting, on a PUCCH, a DMRS corresponding to the shifted DMRS sequence with pi/2 BPSK modulation (block 830). For example, the UE (e.g., using modulator 254, transmit processor 264, TX MIMO processor 266, controller/processor 280, memory 282, and/or the like) may transmit, on a PUCCH, a DMRS corresponding to the shifted DMRS sequence with pi/2 BPSK modulation, as described above, for example, with reference to FIGS. 5, 6A, and/or 6B.

Process 800 may include additional aspects, such as any single aspect or any combination of aspects described below and/or in connection with one or more other processes described elsewhere herein.

In a first aspect, the one or more DMRS sequences are based at least in part on respective pi/2 BPSK modulated computer-generated binary sequences. In a second aspect, alone or in combination with the first aspect, the PUCCH is a PUCCH format 4. In a third aspect, alone or in combination with one or more of the first and second aspects, transmitting the DMRS comprises transmitting the DMRS on the PUCCH in an RB, the DMRS being multiplexed, in the RB, with one or more other DMRSs transmitted from one or more other UEs.

In a fourth aspect, alone or in combination with one or more of the first through third aspects, process 800 further comprises selecting the cyclic shift index from the group of cyclic shift indexes based at least in part on at least one of an occ-index associated with the UE or a DMRS sequence index associated with the DMRS sequence. In a fifth aspect, alone or in combination with one or more of the first through fourth aspects, process 800 further comprises receiving an indication of the occ-index, and selecting the cyclic shift index from the group of cyclic shift indexes comprises selecting the cyclic shift index from the group of cyclic shift indexes based at least in part on the indication of the occ-index.

In a sixth aspect, alone or in combination with one or more of the first through fifth aspects, receiving the indication of the occ-index comprises receiving the indication of the occ-index in at least one of an RRC communication, a MAC-CE communication, or a DCI communication. In a seventh aspect, alone or in combination with one or more of the first through sixth aspects, receiving the indication of the plurality of groups of cyclic shift indexes comprises receiving the indication of the plurality of groups of cyclic shift indexes in at least one of an RRC communication, a MAC-CE communication, or a DCI communication.

In an eighth aspect, alone or in combination with one or more of the first through seventh aspects, the one or more DMRS sequences are associated with respective DMRS sequence indexes, process 800 further comprises determining, based at least in part on a DMRS sequence index associated with the DMRS sequence, that the DMRS sequence is associated with the group of cyclic shift indexes, and shifting the DMRS sequence based at least in part on the cyclic shift index that is included in the group of cyclic shift indexes associated with the DMRS sequence comprises shifting, based at least in part on determining that the group of cyclic shift indexes is associated with the DMRS sequence, the DMRS sequence based at least in part on the cyclic shift index that is included in the group of cyclic shift indexes.

In a ninth aspect, alone or in combination with one or more of the first through eighth aspects, process 800 further comprises receiving an indication of the respective DMRS sequence indexes based at least in part on at least one of an RRC communication, a MAC-CE communication, or a DCI communication. In a tenth aspect, alone or in combination with one or more of the first through ninth aspects, process 800 further comprises receiving an indication of respective associations between each group of cyclic shift indexes, of the plurality of groups of cyclic shift indexes, the one or more DMRS sequences in at least one of an RRC communication, a MAC-CE communication, or a DCI communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

cyclically shifting, based at least in part on a cyclic shift index selected from a group of cyclic shift indexes, a demodulation reference signal (DMRS) sequence,
wherein each cyclic gap between cyclic shift indexes included in the group of cyclic shift indexes is at least 2 and is not 6, and
wherein a first value of a first cyclic gap is different from a second value of a second cyclic gap; and
transmitting, on a physical uplink control channel (PUCCH), a DMRS corresponding to the shifted DMRS sequence with pi/2 binary phase shift key (BPSK) modulation.

2. The method of claim 1, wherein the PUCCH is a PUCCH format 4.

3. The method of claim 1, wherein transmitting the DMRS comprises:
transmitting the DMRS on the PUCCH in a resource block (RB),
wherein the DMRS is multiplexed, in the RB, with one or more other DMRSs transmitted from one or more other UEs.

4. The method of claim 1, further comprising:
selecting the cyclic shift index from the group of cyclic shift indexes based at least in part on an orthogonal cover code index (occ-index) associated with the UE.

5. The method of claim 4, further comprising:
receiving an indication of the occ-index; and
wherein selecting the cyclic shift index from the group of cyclic shift indexes comprises:
selecting the cyclic shift index from the group of cyclic shift indexes based at least in part on the indication of the occ-index.

6. The method of claim 5, wherein receiving the indication of the occ-index comprises:
receiving the indication of the occ-index in at least one of:
a radio resource control (RRC) communication,
a medium access control (MAC) control element (MAC-CE) communication, or
a downlink control information (DCI) communication.

7. The method of claim 1, wherein the group of cyclic shift indexes is associated with a plurality of DMRS sequences,
wherein the plurality of DMRS sequences are based at least in part on respective pi/2 BPSK modulated computer-generated binary sequences.

8. The method of claim 1, wherein the group of cyclic shift indexes includes cyclic shift indexes (0,2,5,10) or cyclic shift indexes (0,2,7,10) for a PUCCH format 4 configured multiplexing capacity equal to 4.

9. The method of claim 1, wherein the group of cyclic shift indexes includes cyclic shift indexes (0,5) or cyclic shift indexes (0,7) for a PUCCH format 4 configured multiplexing capacity equal to 2.

10. A method of wireless communication performed by a user equipment (UE), comprising:
receiving an indication of a plurality of groups of cyclic shift indexes,
wherein each group of cyclic shift indexes, of the plurality of groups of cyclic shift indexes, is associated with one or more demodulation reference signal (DMRS) sequences;
cyclically shifting a DMRS sequence of the one or more DMRS sequences based at least in part on a cyclic shift index that is included in a group of cyclic shift indexes associated with the DMRS sequence,
wherein a first value of a first cyclic gap between cyclic shift indexes included in the group of cyclic shift indexes associated with the DMRS sequence is different from a second value of a second cyclic gap between the cyclic shift indexes included in the group of cyclic shift indexes associated with the DMRS sequence; and
transmitting, on a physical uplink control channel (PUCCH), a DMRS corresponding to the shifted DMRS sequence with pi/2 binary phase shift key (BPSK) modulation.

11. The method of claim 10, wherein the one or more DMRS sequences are based at least in part on respective pi/2 BPSK modulated computer-generated binary sequences.

12. The method of claim 10, wherein the PUCCH is a PUCCH format 4.

13. The method of claim 10, wherein transmitting the DMRS comprises:
transmitting the DMRS on the PUCCH in a resource block (RB),
wherein the DMRS is multiplexed, in the RB, with one or more other DMRSs transmitted from one or more other UEs.

14. The method of claim 10, further comprising:
selecting the cyclic shift index from the group of cyclic shift indexes associated with the DMRS sequence based at least in part on at least one of:
an orthogonal cover code index (occ-index) associated with the UE, or
a DMRS sequence index associated with the DMRS sequence.

15. The method of claim 14, further comprising:
receiving an indication of the occ-index; and
wherein selecting the cyclic shift index from the group of cyclic shift indexes associated with the DMRS sequence comprises:
selecting the cyclic shift index from the group of cyclic shift indexes associated with the DMRS sequence based at least in part on the indication of the occ-index.

16. The method of claim 15, wherein receiving the indication of the occ-index comprises:
receiving the indication of the occ-index in at least one of:
a radio resource control (RRC) communication,
a medium access control (MAC) control element (MAC-CE) communication, or
a downlink control information (DCI) communication.

17. The method of claim 10, wherein receiving the indication of the plurality of groups of cyclic shift indexes comprises:
receiving the indication of the plurality of groups of cyclic shift indexes in at least one of:
a radio resource control (RRC) communication,
a medium access control (MAC) control element (MAC-CE) communication, or
a downlink control information (DCI) communication.

18. The method of claim 10, wherein the one or more DMRS sequences are associated with respective DMRS sequence indexes; and
wherein the method further comprises:
determining, based at least in part on a DMRS sequence index associated with the DMRS sequence, that the DMRS sequence is associated with the group of cyclic shift indexes; and
wherein cyclically shifting the DMRS sequence comprises:
cyclically shifting, based at least in part on determining that the group of cyclic shift indexes is associated with the DMRS sequence, the DMRS sequence.

19. The method of claim 18, further comprising:
receiving an indication of the respective DMRS sequence indexes based at least in part on at least one of:
a radio resource control (RRC) communication,
a medium access control (MAC) control element (MAC-CE) communication, or
a downlink control information (DCI) communication.

20. The method of claim 10, further comprising:
receiving an indication of respective associations between each group of cyclic shift indexes, of the plurality of groups of cyclic shift indexes, and the one or more DMRS sequences in at least one of:
a radio resource control (RRC) communication,
a medium access control (MAC) control element (MAC-CE) communication, or
a downlink control information (DCI) communication.

21. A user equipment (UE) for wireless communication, comprising:
a memory; and
one or more processors coupled to the memory, the memory and the one or more processors configured to:
cyclically shift, based at least in part on a cyclic shift index selected from a group of cyclic shift indexes, a demodulation reference signal (DMRS) sequence,
wherein each cyclic gap between cyclic shift indexes included in the group of cyclic shift indexes is at least 2 and is not 6, and
wherein a first value of a first cyclic gap is different from a second value of a second cyclic gap; and
transmit, on a physical uplink control channel (PUCCH), a DMRS corresponding to the shifted DMRS sequence with pi/2 binary phase shift key (BPSK) modulation.

22. The UE of claim 21, wherein the one or more processors, when transmitting the DMRS, are to:
transmit the DMRS on the PUCCH in a resource block (RB),
wherein the DMRS is multiplexed, in the RB, with one or more other DMRSs transmitted from one or more other UEs.

23. The UE of claim 21, wherein the one or more processors are further configured to:
select the cyclic shift index from the group of cyclic shift indexes based at least in part on an orthogonal cover code index (occ-index) associated with the UE.

24. The UE of claim 23, wherein the one or more processors are further configured to:
receive an indication of the occ-index in at least one of:
a radio resource control (RRC) communication,
a medium access control (MAC) control element (MAC-CE) communication, or
a downlink control information (DCI) communication; and
wherein the one or more processors, when selecting the cyclic shift index from the group of cyclic shift indexes, are configured to:
select the cyclic shift index from the group of cyclic shift indexes based at least in part on the indication of the occ-index.

25. The UE of claim 21, wherein the group of cyclic shift indexes is associated with a plurality of DMRS sequences,
wherein the plurality of DMRS sequences are based at least in part on respective pi/2 BPSK modulated computer-generated binary sequences.

26. The UE of claim 21, wherein the group of cyclic shift indexes includes cyclic shift indexes (0,2,5,10) or cyclic shift indexes (0,2,7,10) for a PUCCH format 4 configured multiplexing capacity equal to 4, or
   wherein the group of cyclic shift indexes includes cyclic shift indexes (0,5) or cyclic shift indexes (0,7) for a PUCCH format 4 configured multiplexing capacity equal to 2.

27. A non-transitory computer-readable medium storing one or more instructions for wireless communication, the one or more instructions comprising:
   one or more instructions that, when executed by one or more processors of a user equipment (UE), cause the one or more processors to:
      cyclically shift, based at least in part on a cyclic shift index selected from a group of cyclic shift indexes, a demodulation reference signal (DMRS) sequence,
         wherein each cyclic gap between cyclic shift indexes included in the group of cyclic shift indexes is at least 2 and is not 6, and
         wherein a first value of a first cyclic gap is different from a second value of a second cyclic gap; and
      transmit, on a physical uplink control channel (PUCCH), a DMRS corresponding to the shifted DMRS sequence with pi/2 binary phase shift key (BPSK) modulation.

28. The non-transitory computer-readable medium of claim 27, wherein the one or more instructions, that caused the one or more processors to transmit the DMRS, cause the one or more processors to:
   transmit the DMRS on the PUCCH in a resource block (RB),
      wherein the DMRS is multiplexed, in the RB, with one or more other DMRSs transmitted from one or more other UEs.

29. The non-transitory computer-readable medium of claim 27, wherein the one or more instructions, when executed by the one or more processors, further cause the one or more processors to:
   select the cyclic shift index from the group of cyclic shift indexes based at least in part on an orthogonal cover code index (occ-index) associated with the UE.

30. The non-transitory computer-readable medium of claim 29, wherein the one or more instructions, when executed by the one or more processors, further cause the one or more processors to:
   receive an indication of the occ-index in at least one of:
      a radio resource control (RRC) communication,
      a medium access control (MAC) control element (MAC-CE) communication, or
      a downlink control information (DCI) communication; and
   wherein the one or more instructions, that caused the one or more processors to select the cyclic shift index from the group of cyclic shift indexes, cause the one or more processors to:
      select the cyclic shift index from the group of cyclic shift indexes based at least in part on the indication of the occ-index.

31. An apparatus for wireless communication, comprising:
   means for cyclically shifting, based at least in part on a cyclic shift index selected from a group of cyclic shift indexes, a demodulation reference signal (DMRS) sequence,
      wherein each cyclic gap between cyclic shift indexes included in the group of cyclic shift indexes is at least 2 and is not 6, and
      wherein a first value of a first cyclic gap is different from a second value of a second cyclic gap; and
   means for transmitting, on a physical uplink control channel (PUCCH), a DMRS corresponding to the shifted DMRS sequence with pi/2 binary phase shift key (BPSK) modulation.

32. The apparatus of claim 31, wherein the means for transmitting the DMRS comprises:
   means for transmitting the DMRS on the PUCCH in a resource block (RB),
      wherein the DMRS is multiplexed, in the RB, with one or more other DMRSs transmitted from one or more other apparatuses.

33. The apparatus of claim 31, further comprising:
   means for selecting the cyclic shift index from the group of cyclic shift indexes based at least in part on an orthogonal cover code index (occ-index) associated with the apparatus.

34. The apparatus of claim 33, further comprising:
   means for receiving an indication of the occ-index in at least one of:
      a radio resource control (RRC) communication,
      a medium access control (MAC) control element (MAC-CE) communication, or
      a downlink control information (DCI) communication; and
   wherein the means for selecting the cyclic shift index from the group of cyclic shift indexes, comprises:
      means for selecting the cyclic shift index from the group of cyclic shift indexes based at least in part on the indication of the occ-index.

35. The apparatus of claim 31, wherein the group of cyclic shift indexes is associated with a plurality of DMRS sequences,
   wherein the plurality of DMRS sequences are based at least in part on respective pi/2 BPSK modulated computer-generated binary sequences.

36. The apparatus of claim 31, wherein the group of cyclic shift indexes includes cyclic shift indexes (0,2,5,10) or cyclic shift indexes (0,2,7,10) for a PUCCH format 4 configured multiplexing capacity equal to 4, or
   wherein the group of cyclic shift indexes includes cyclic shift indexes (0,5) or cyclic shift indexes (0,7) for a PUCCH format 4 configured multiplexing capacity equal to 2.

37. A user equipment (UE) for wireless communication, comprising:
   a memory; and
   one or more processors operatively coupled to the memory, the memory and the one or more processors configured to:
      receive an indication of a plurality of groups of cyclic shift indexes,
         wherein each group of cyclic shift indexes, of the plurality of groups of cyclic shift indexes, is associated with one or more demodulation reference signal (DMRS) sequences;
      cyclically shift a DMRS sequence of the one or more DMRS sequences based at least in part on a cyclic shift index that is included in a group of cyclic shift indexes associated with the DMRS sequence,
         wherein a first value of a first cyclic gap between cyclic shift indexes included in the group of cyclic shift indexes associated with the DMRS sequence is different from a second value of a second cyclic gap between the cyclic shift indexes included in the group of cyclic shift indexes associated with the DMRS sequence; and transmit, on a physical uplink control channel (PUCCH), a DMRS corresponding to the shifted DMRS sequence with pi/2 binary phase shift key (BPSK) modulation.

38. The UE of claim 37, wherein the one or more DMRS sequences are based at least in part on respective pi/2 BPSK modulated computer-generated binary sequences.

39. The UE of claim 37, wherein the one or more processors, when transmitting the DMRS, are to:
transmit the DMRS on the PUCCH in a resource block (RB),
wherein the DMRS is multiplexed, in the RB, with one or more other DMRSs transmitted from one or more other UEs.

40. The UE of claim 37, wherein the one or more processors are further configured to:
select the cyclic shift index from the group of cyclic shift indexes associated with the DMRS sequence based at least in part on at least one of:
an orthogonal cover code index (occ-index) associated with the UE, or
a DMRS sequence index associated with the DMRS sequence.

41. The UE of claim 40, wherein the one or more processors are further configured to:
receive an indication of the occ-index in at least one of:
a radio resource control (RRC) communication,
a medium access control (MAC) control element (MAC-CE) communication, or
a downlink control information (DCI) communication; and
wherein the one or more processors, when selecting the cyclic shift index from the group of cyclic shift indexes associated with the DMRS sequence, are configured to:
select the cyclic shift index from the group of cyclic shift indexes associated with the DMRS sequence based at least in part on the indication of the occ-index.

42. The UE of claim 37, wherein the one or more DMRS sequences are associated with respective DMRS sequence indexes; and
wherein the one or more processors are further configured to:
determine, based at least in part on a DMRS sequence index associated with the DMRS sequence, that the DMRS sequence is associated with the group of cyclic shift indexes; and
wherein the one or more processors, when cyclically shifting the DMRS sequence are configured to:
cyclically shift, based at least in part on determining that the group of cyclic shift indexes is associated with the DMRS sequence, the DMRS sequence.

43. A non-transitory computer-readable medium storing one or more instructions for wireless communication, the one or more instructions comprising:
one or more instructions that, when executed by one or more processors of a user equipment (UE), cause the one or more processors to:
receive an indication of a plurality of groups of cyclic shift indexes,
wherein each group of cyclic shift indexes, of the plurality of groups of cyclic shift indexes, is associated with one or more demodulation reference signal (DMRS) sequences;
cyclically shift a DMRS sequence of the one or more DMRS sequences based at least in part on a cyclic shift index that is included in a group of cyclic shift indexes associated with the DMRS sequence,
wherein a first value of a first cyclic gap between cyclic shift indexes included in the group of cyclic shift indexes associated with the DMRS sequence is different from a second value of a second cyclic gap between the cyclic shift indexes included in the group of cyclic shift indexes associated with the DMRS sequence; and
transmit, on a physical uplink control channel (PUCCH), a DMRS corresponding to the shifted DMRS sequence with pi/2 binary phase shift key (BPSK) modulation.

44. The non-transitory computer-readable medium of claim 43, wherein the one or more instructions, when executed by the one or more processors, further cause the one or more processors to:
select the cyclic shift index from the group of cyclic shift indexes associated with the DMRS sequence based at least in part on at least one of:
an orthogonal cover code index (occ-index) associated with the UE, or
a DMRS sequence index associated with the DMRS sequence.

45. The non-transitory computer-readable medium of claim 44, wherein the one or more instructions, when executed by the one or more processors, further cause the one or more processors to:
receive an indication of the occ-index in at least one of:
a radio resource control (RRC) communication,
a medium access control (MAC) control element (MAC-CE) communication, or
a downlink control information (DCI) communication; and
wherein the one or more instructions, that cause the one or more processors to select the cyclic shift index from the group of cyclic shift indexes associated with the DMRS sequence, cause the one or more processors to:
select the cyclic shift index from the group of cyclic shift indexes associated with the DMRS sequence based at least in part on the indication of the occ-index.

46. The non-transitory computer-readable medium of claim 43, wherein the one or more DMRS sequences are associated with respective DMRS sequence indexes; and
wherein the one or more instructions, when executed by the one or more processors, further cause the one or more processors to:
determine, based at least in part on a DMRS sequence index associated with the DMRS sequence, that the DMRS sequence is associated with the group of cyclic shift indexes; and
wherein the one or more instructions, that cause the one or more processors to cyclically shift the DMRS sequence, cause the one or more processors to:
cyclically shift, based at least in part on determining that the group of cyclic shift indexes is associated with the DMRS sequence, the DMRS sequence.

47. An apparatus for wireless communication, comprising:
means for receiving an indication of a plurality of groups of cyclic shift indexes, wherein each group of cyclic shift indexes, of the plurality of groups of cyclic shift indexes, is associated with one or more demodulation reference signal (DMRS) sequences;

means for cyclically shifting a DMRS sequence of the one or more DMRS sequences based at least in part on a cyclic shift index that is included in a group of cyclic shift indexes associated with the DMRS sequence, wherein a first value of a first cyclic gap between cyclic shift indexes included in the group of cyclic shift indexes associated with the DMRS sequence is different from a second value of a second cyclic gap between the cyclic shift indexes included in the group of cyclic shift indexes associated with the DMRS sequence; and means for transmitting, on a physical uplink control channel (PUCCH), a DMRS corresponding to the shifted DMRS sequence with pi/2 binary phase shift key (BPSK) modulation.

48. The apparatus of claim 47, wherein the one or more DMRS sequences are based at least in part on respective pi/2 BPSK modulated computer-generated binary sequences.

49. The apparatus of claim 47, wherein the means for transmitting the DMRS comprises:

means for transmitting the DMRS on the PUCCH in a resource block (RB), wherein the DMRS is multiplexed, in the RB, with one or more other DMRSs transmitted from one or more other apparatuses.

50. The apparatus of claim 47, further comprising:

means for selecting the cyclic shift index from the group of cyclic shift indexes based at least in part on at least one of:

an orthogonal cover code index (occ-index) associated with the apparatus, or a DMRS sequence index associated with the DMRS sequence.

51. The apparatus of claim 50, further comprising:

receiving an indication of the occ-index in at least one of:

a radio resource control (RRC) communication, a medium access control (MAC) control element (MAC-CE) communication, or a downlink control information (DCI) communication; and wherein the means for selecting the cyclic shift index from the group of cyclic shift indexes associated with the DMRS sequence, comprises:

means for selecting the cyclic shift index from the group of cyclic shift indexes associated with the DMRS sequence based at least in part on the indication of the occ-index.

52. The apparatus of claim 47, wherein the one or more DMRS sequences are associated with respective DMRS sequence indexes; and wherein the apparatus further comprises:

means for determining, based at least in part on a DMRS sequence index associated with the DMRS sequence, that the DMRS sequence is associated with the group of cyclic shift indexes; and wherein the means for cyclically shifting the DMRS sequence comprises:

means for cyclically shifting, based at least in part on determining that the group of cyclic shift indexes is associated with the DMRS sequence, the DMRS sequence.

* * * * *